(12) United States Patent
Auchmoody et al.

(10) Patent No.: US 9,904,602 B1
(45) Date of Patent: Feb. 27, 2018

(54) SECURE SEARCH

(71) Applicant: EMC IP Holding Company LLC, Hopkinton, MA (US)

(72) Inventors: Scott Clifford Auchmoody, Irvine, CA (US); Erik S. Hansen, Mission Viejo, CA (US); Jeffrey R. Norton, Laguna Niguel, CA (US); Junxu Li, Pleasanton, CA (US); Mark David Malamut, Dana Point, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 291 days.

(21) Appl. No.: 14/579,949

(22) Filed: Dec. 22, 2014

(51) Int. Cl.
*G06F 17/30* (2006.01)
*G06F 11/14* (2006.01)

(52) U.S. Cl.
CPC .... *G06F 11/1448* (2013.01); *G06F 17/30424* (2013.01)

(58) Field of Classification Search
USPC ........................................ 707/640, 679, 694
See application file for complete search history.

(56) References Cited

U.S. PATENT DOCUMENTS

| | | | | |
|---|---|---|---|---|
| 6,460,055 B1* | 10/2002 | Midgley | ............. | G06F 11/1461 707/640 |
| 6,526,418 B1* | 2/2003 | Midgley | ............. | G06F 11/1451 707/640 |
| 8,131,739 B2* | 3/2012 | Wu | .................... | G06F 17/30604 707/758 |
| 8,935,751 B1* | 1/2015 | Cardente | ............. | G06F 21/6218 709/229 |
| 9,021,581 B1* | 4/2015 | Bezalel | .................... | G06F 9/455 726/21 |
| 2005/0049993 A1* | 3/2005 | Nori | .................. | G06F 17/30595 |
| 2005/0050053 A1* | 3/2005 | Thompson | ........ | G06F 17/30595 |
| 2005/0050054 A1* | 3/2005 | Clark | ................ | G06F 17/30174 |
| 2005/0050537 A1* | 3/2005 | Thompson | ................ | G06F 8/24 717/165 |
| 2005/0055354 A1* | 3/2005 | Thompson | ........ | G06F 17/30067 |
| 2006/0074939 A1* | 4/2006 | Mazzagatti | ....... | G06F 17/30327 |
| 2006/0112096 A1* | 5/2006 | Ahluwalia | ........ | G06F 17/30079 |
| 2009/0055921 A1* | 2/2009 | Field | .................... | G06F 21/6236 726/14 |
| 2010/0082552 A1* | 4/2010 | Beatty | ................. | G06F 11/1469 707/674 |

(Continued)

OTHER PUBLICATIONS

Wikipedia, "Bloom filter", http://en.m.wikipedia.org/wiki/Bloom_filter, 2014.

(Continued)

*Primary Examiner* — Cam-Linh Nguyen
(74) *Attorney, Agent, or Firm* — Van Pelt, Yi & James LLP

(57) ABSTRACT

Backup objects, native security descriptors that describe access rights to the backup objects, and object metadata are received from platforms where each backup object has corresponding object metadata. Each native security descriptor is transformed into a platform independent security descriptor. A partitioned structure is generated, including by associating each platform independent security descriptor with those object metadata that correspond to the plurality of backup objects for which that platform independent security descriptor describes access rights to.

22 Claims, 12 Drawing Sheets

(56) References Cited

U.S. PATENT DOCUMENTS

| | | | |
|---|---|---|---|
| 2011/0179279 A1* | 7/2011 | Greevenbosch | G06F 11/1448 713/176 |
| 2015/0121545 A1* | 4/2015 | Chandrasekaran | G06F 21/6227 726/27 |
| 2015/0324255 A1* | 11/2015 | Kochunni | G06F 11/1448 711/162 |

OTHER PUBLICATIONS

Leung et al., "Spyglass: Fast, Scalable Metadata Search for Large-Scale Storage Systems", 7th USENIX Conference on File and Storage Technologies, pp. 153-166, 2009.
Parker-Wood et al., "Security Aware Partitioning for Efficient File System Search", IEEE, 2010.

* cited by examiner

Windows Security Descriptor

| Security Identifier for Owner | | | |
|---|---|---|---|
| Security Identifier for Group | | | |
| Access Control List (ACL) - An ACL is 1 or more ACE | | | |
| Access Control Entry (ACE) | | | |
| Action | Identifier | Right(s) | Attributes |
| Deny | Sales | RWX | |
| Allow | Jane.lee(UserID) | RWX | |
| Allow | Project_X(GroupID) | R | |

Generic Platform Independent Security Descriptor

| Action | Identifier | Right(s) | Attributes |
|---|---|---|---|
| Allow | | | Key Value Pair(s) |
| Deny | | | Key Value Pair(s) |
| Audit | | | Key Value Pair(s) |
| Alarm | | | Key Value Pair(s) |

} Access Control Entries (ACE)

*← 620*

Platform Independent Security Descriptor for Backed Up Project File(s)

| Action | Identifier | Right(s) | Attributes |
|---|---|---|---|
| Allow | jane.lee (User ID) | rwx | <Not Used> |
| Allow | Project_X (Group ID) | r-x | <Not Used> |
| Audit | Contractor (Group ID) | r-- | <Not Used> |
| Alarm | <Anything> | <Anything> | (Restore Location, <Outside of Company Network>) |

*← 640*

Platform Independent Security Descriptor for Backed Up Virtual Machine Image(s)

| Action | Identifier | Right(s) | Attributes |
|---|---|---|---|
| Allow | jane.lee (User ID) | rwx | (Boot Location, Jane's Computer) |

*← 660*

Platform Independent Security Descriptor for Backed Up Configuration(s)

| Action | Identifier | Right(s) | Attributes |
|---|---|---|---|
| Allow | jane.lee (User ID) | rwx | (Restore Location, Jane's Computer) |

FIG. 6A

SECURE SEARCH

BACKGROUND OF THE INVENTION

It would be desirable if operational expenses associated with backup and recovery systems could be reduced and/or the need to contact a backup administrator to recover lost files could be eliminated.

BRIEF DESCRIPTION OF THE DRAWINGS

Various embodiments of the invention are disclosed in the following detailed description and the accompanying drawings.

FIG. 3B is a diagram illustrating an embodiment of a Windows security descriptor.

FIG. 6A is a diagram illustrating some embodiments of platform independent security descriptors.

DETAILED DESCRIPTION

Figure 1:
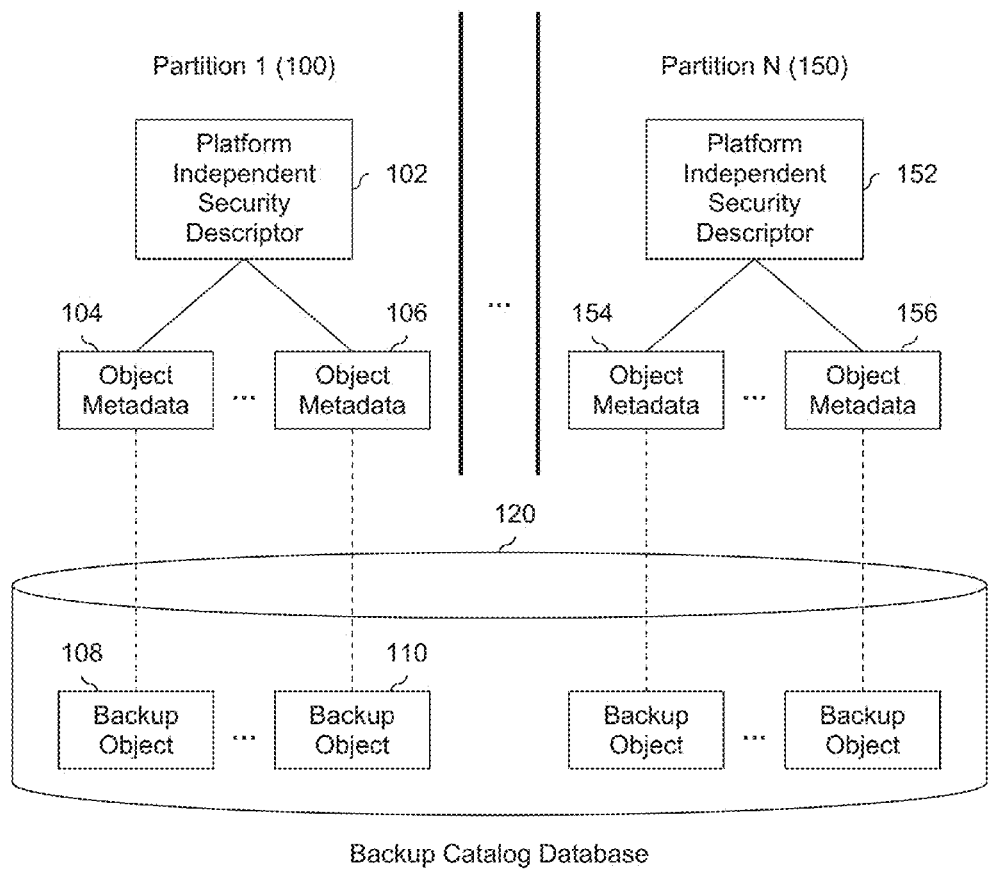
FIG. 1 is a diagram illustrating an embodiment of a partitioned structure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A search system is described herein which permits users to search for backup objects without requiring the assistance of a system administrator. Without such a system, if a user wants to restore something, that user would need to ask a system administrator to restore the desired backup object (e.g., a file or directory which was accidentally deleted or misplaced) by providing identifying information about the desired item (e.g., a file name) to the system administrator. The system administrator would then use a restoration application to restore the desired item. Using the secure search system described herein enables the user to have access to all retained versions, across the entire network, and/or even if the original, protected data is not available. In some embodiments, this is all provided through a single portal.

The search system described herein is a secure one which does not return search results to the user which the user would not otherwise be permitted to access on the protected system. For example, per an exemplary company policy, employees in the engineering department are not permitted to access financial documents and files but they are permitted to access engineering documents and files. Conversely, employees in the finance departments are permitted to access financial information but are not permitted to access engineering project information. The search system described herein ensures that only information which the user is permitted to access (e.g., normally on the protected system) is returned to the search user in the search results.

The search system described herein also permits the user to search over multiple platforms. For example, some companies may have both LINUX data and Windows data, all of which are backed up. In some embodiments, the protected data is stored in a "cloud" and older versions of the data stored on the cloud are backed up. The search system described herein permits a user to search through both LINUX backup objects, Windows backup objects, and/or other backup objects with a single search operation and/or a single search query. The searches are performed across all protection copy data, not the primary storage systems. This allows the user to search all data they have access to from all protected storage without having to go to the source of that data or even have the primary storage accessible.

The search system described herein uses a partitioned structure where each partition includes a single security descriptor which describes access rules for the backup objects associated with that partition. In some embodiments, the partitioned structure does not actually include the backup objects themselves (since that would make the partitioned structure being searched very large and unnecessarily so). Rather, in such embodiments, the partitioned structure (e.g., stored on a backup catalog server) includes links or references to the backup objects (e.g., stored on backup catalog database). As will be described in further detail below, a partitioned structure enables fast searching. In enterprise systems where there are many backup objects, faster searching is an attractive feature.

First, an example of a partitioned structure is described. Then, examples of how the partitioned structure is built and how the partitioned structure is used during a search are described.

FIG. 1 is a diagram illustrating an embodiment of a partitioned structure. In the example shown there are N partitions, including partition 1 (100) and partition N (150). Each partition includes a single platform independent security descriptor (e.g., security descriptor 102) which describes access rights to associated backup objects (e.g., backup objects 108 and 110). Each backup object has object metadata (e.g., object metadata 104 and 106) associated with it which includes information about the corresponding backup object. For example, if the backup object is a file, the object metadata for that backup object may include the file name, the last time that backed up copy of the file was modified, the size of the backed up copy of the file, the file type, etc. The backup objects themselves are stored on a backup catalog database 120; each piece of object metadata may include a link to the corresponding backup object so that it can be accessed and restored (if desired).

In some embodiments, the platform independent security descriptors and object metadata are stored on a backup catalog server (not shown), for example which manages information stored in a backup catalog database. The backup catalog server may provide secure search services and storing the platform independent security descriptors and object metadata on the backup catalog server may enable a faster search.

Figure 2:
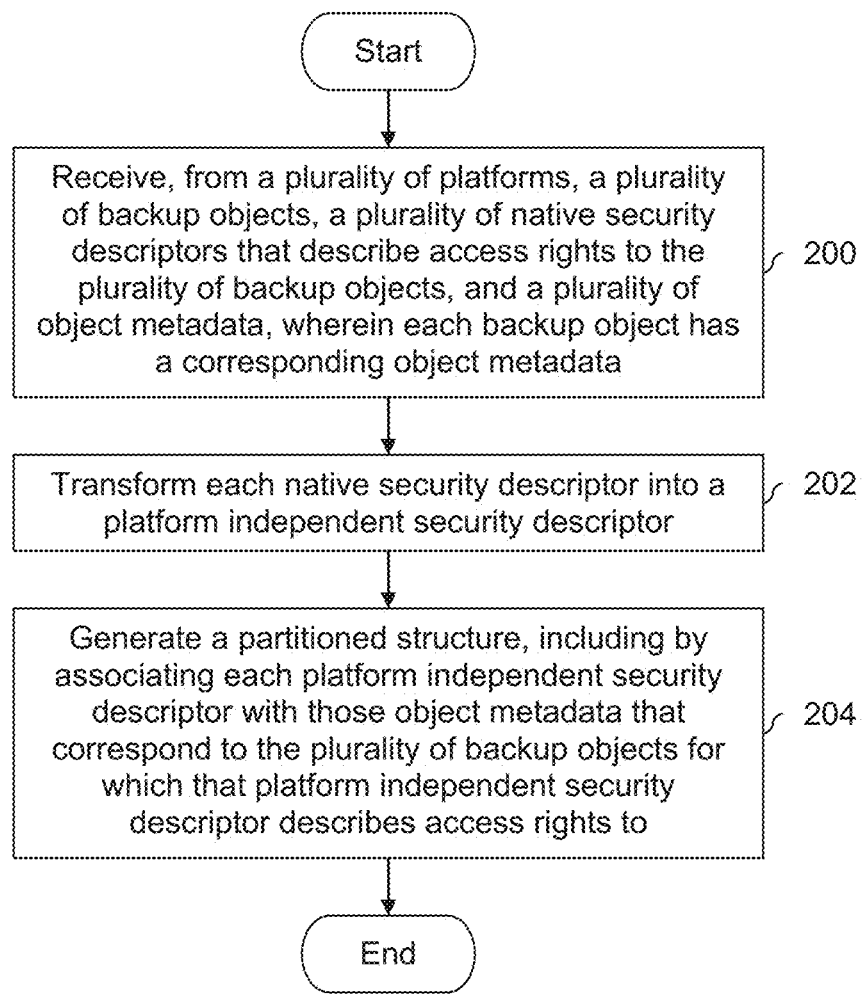
FIG. 2 is a flowchart illustrating an embodiment of process for building a partitioned structure.

FIG. 2 is a flowchart illustrating an embodiment of process for building a partitioned structure. For example, the partitioned structure shown in FIG. 1 may be built using the process of FIG. 2. In some embodiments, the process of FIG. 2 may be used to generate an initial version of a partitioned structure (e.g., from scratch) and subsequent runs of FIG. 2 are used to update the partitioned structure as new backups are performed.

At 200, a plurality of backup objects, a plurality of native security descriptors that describe access rights to the plurality of backup objects, and a plurality of object metadata are received from a plurality of platforms, wherein each backup object has corresponding object metadata. The following figure shows one example of this.

Figure 3A:
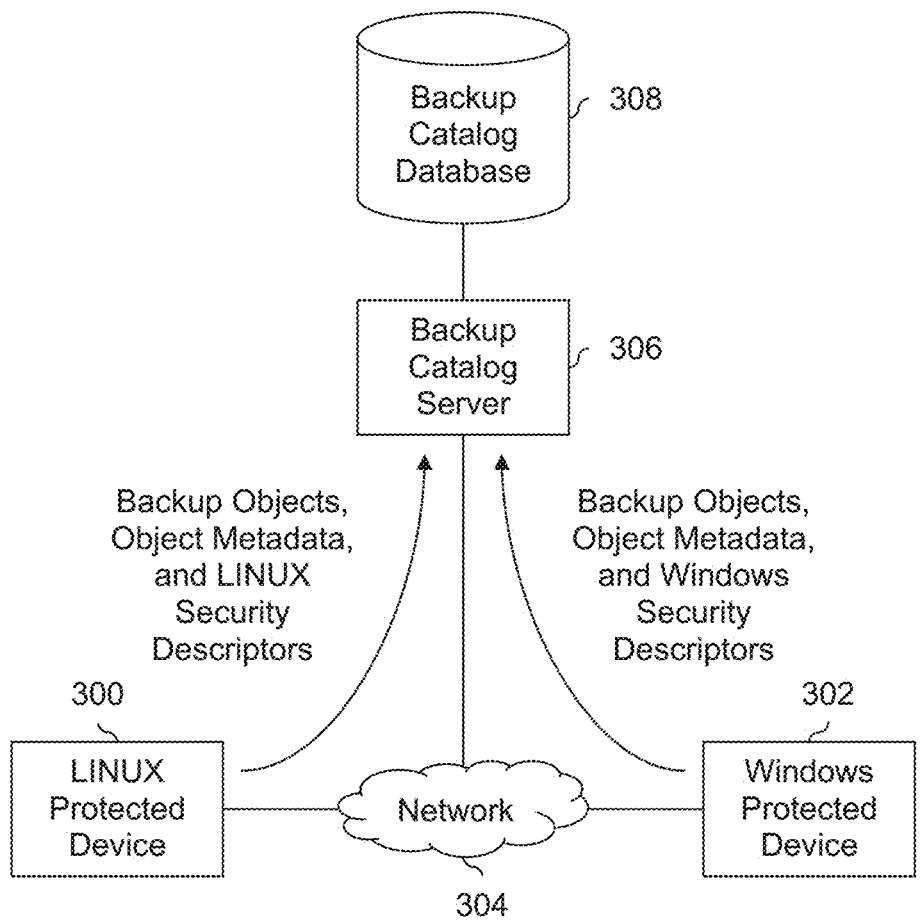
FIG. 3A is a diagram illustrating an embodiment of a protected system in which a partitioned structure is built.

FIG. 3A is a diagram illustrating an embodiment of a protected system in which a partitioned structure is built. In the example shown, backup catalog server 306 is performing the process of FIG. 2 in order to build a searchable partitioned structure. Protected device 300 is a LINUX device and protected device 302 is a Windows device. Backup objects, object metadata, and LINUX security descriptors are sent from LINUX protected device 300 to backup catalog server 306 via network 304. Similarly, Windows protected device 302 sends Backup objects, object metadata, and Windows security descriptors to backup catalog server 306 via network 304.

The LINUX security descriptors and Windows security descriptors sent from the protected devices to backup catalog server are examples of native security descriptors. A native security descriptor describes access rights for one or more associated backup objects per the native format or technology (e.g., as the permissions or access rights are described in situ). Some example access rights includes read (e.g., being able to open the file), write (e.g., being able to modify the file), and execute (e.g., being able to run the file). An access right may relate to a specific user (e.g., having a specific user ID) or a specific group (e.g. having a specific group ID). The various fields, values, and/or organization of a native security descriptor will depend upon the particular platform.

In one example of a LINUX security descriptor sent from LINUX protected device 300 to backup catalog database 308, a LINUX security descriptor includes 3 permission triads (e.g., "rwxr-xr--" where an "r" indicates reading is permitted, "w" indicates writing is permitted, and "x" indicates execution is permitted), an associated user ID (e.g., "jane.lee"), and an associated group ID (e.g., "Project_X"). The first permission triad (e.g., "rwx") indicates the permissions of the owner of the file (e.g., "jane.lee"). The second permission triad (e.g., "r-x") indicates the permissions of the group members of the file (e.g., "Project_X"). The third permission triad (e.g., "r--") indicates what others (e.g., not "jane.lee" and not "Project_X") are permitted to do. Additional permission triads may optionally be added (if desired) such that there may be a fourth permission triad, a fifth permission triad, etc.

FIG. 3B is a diagram illustrating an embodiment of a Windows security descriptor. In some embodiments, such a Windows security descriptor is transformed (e.g., by a backup catalog server) into a platform independent security descriptor. In the example shown, a Windows security descriptor includes a security identifier for an owner, a security identifier for a group, and an access control list (ACL) which in turn includes one or more access control entries (ACEs). Each access control entry includes an action, identifier, right(s), and (optionally) attributes. To put it generally, after transforming any native security descriptor into a platform independent security descriptor, the same level of security or access is maintained as would be experienced on the original data source (e.g., no more, no less).

Returning to FIG. 3A, in some embodiments, a backup client running on each respective protected device collects and sends the information shown to backup catalog server 306. In some embodiments, the information shown is collected and sent to a backup catalog server as part of a backup process.

Returning to FIG. 2, at 202, each native security descriptor is transformed into a platform independent security descriptor. For example, the LINUX security descriptors and Windows security descriptors may be transformed into information which is stored in a database. A database has the benefit of being quickly searchable and is a platform that is independent of both Windows and LINUX.

To continue the example from above where a LINUX security descriptor includes 3 permission triads, the first permission triad (e.g., "rwx") and the user ID (e.g., "jane.lee") are used to create a first access control entry in a given platform independent security descriptor; the second permission triad (e.g., "r-x") and the group ID (e.g., "Project_X") are used to create a second access control entry in the platform independent security descriptor; the third permission triad (e.g., "r--") is used to create a third access control entry in the platform independent security descriptor representing all other authenticated users not given specific permissions by the user and group triads.

In some embodiments, transforming a LINUX security descriptor into a platform independent security descriptor includes taking into consideration the execute (e.g., "x") permission on upper-level directories (e.g., within a file system hierarchy) for which access is required to a lower-level objects. For example, if access to the object/home/user/foo is desired, then execute permission is needed on (1) /, (2) /home, and (3) /home/user in order to access /home/user/foo. In other words, the translation of LINUX security descriptors not only takes into account the file or directory's exact permissions (e.g., at the level of /home/user/foo), but also the trail of execute permissions on all parent directories (e.g., (1) /, (2) /home, and (3) /home/user).

In some embodiments, transforming at step 202 in FIG. 2 includes adding supplemental information (e.g., for which a counterpart did not exist in the native security descriptor) or modifying some piece of information in the native security descriptor. Some examples are described in further detail below.

At 204, a partitioned structure is generated, including by associating each platform independent security descriptor with those object metadata that correspond to the plurality of backup objects for which that platform independent security descriptor describes access rights to. For example, in FIG. 1, this corresponds to creating the associations or links between platform independent security descriptor 102 and object metadata 104 and object metadata 106. Platform independent security descriptor 102 describes access rights to backup objects 108 and 110, object metadata 104 and 106 correspond to those backup objects, and so associations between platform independent security descriptor 102 and object metadata 104 and between platform independent security descriptor 102 and object metadata 106 are created.

In some embodiments, step 204 is performed by a backup catalog server. For example, a backup catalog server may already have to figure out what type of information is being received as a backup data stream goes by (e.g., now I am receiving object metadata for backup object X, now I am receiving backup object X itself, etc.). In some embodiments, as a backup catalog server receives and parses a stream of backup data (e.g., so that it knows what is currently being received (such as the original location of the protected data, file permissions, the actual backup data itself, etc.) and where to store that particular piece of information), the backup catalog server redirects or copies appropriate portions of the backup data stream to an appropriate part of a portioned structure (e.g., creates a new platform independent security descriptor), creates links or associations where appropriate (e.g., between object metadata and a platform independent security descriptor), etc.

In some embodiments, the partitioned structure which is generated at step 204 is stored on a database. A database may enable fast(er) searching of the contents stored within it, even if the amount of information stored is very large, which is desirable for enterprise applications. Many of the enterprise systems which are anticipated to use the secure search system described herein are very large and so the partitioned structure may correspondingly be fairly large.

In some platforms, two files may have identical access rights, but they may each have their own (duplicate) security descriptors in the native platform. In some embodiments, generating a partitioned structure at step 204 includes eliminating or otherwise collapsing duplicate security descriptors so that there is only one security descriptor per partition.

Using the partitioned structure, a secure search of backup objects from different platforms in a network can be performed. The following figure describes an example of such a search process.

Figure 4:
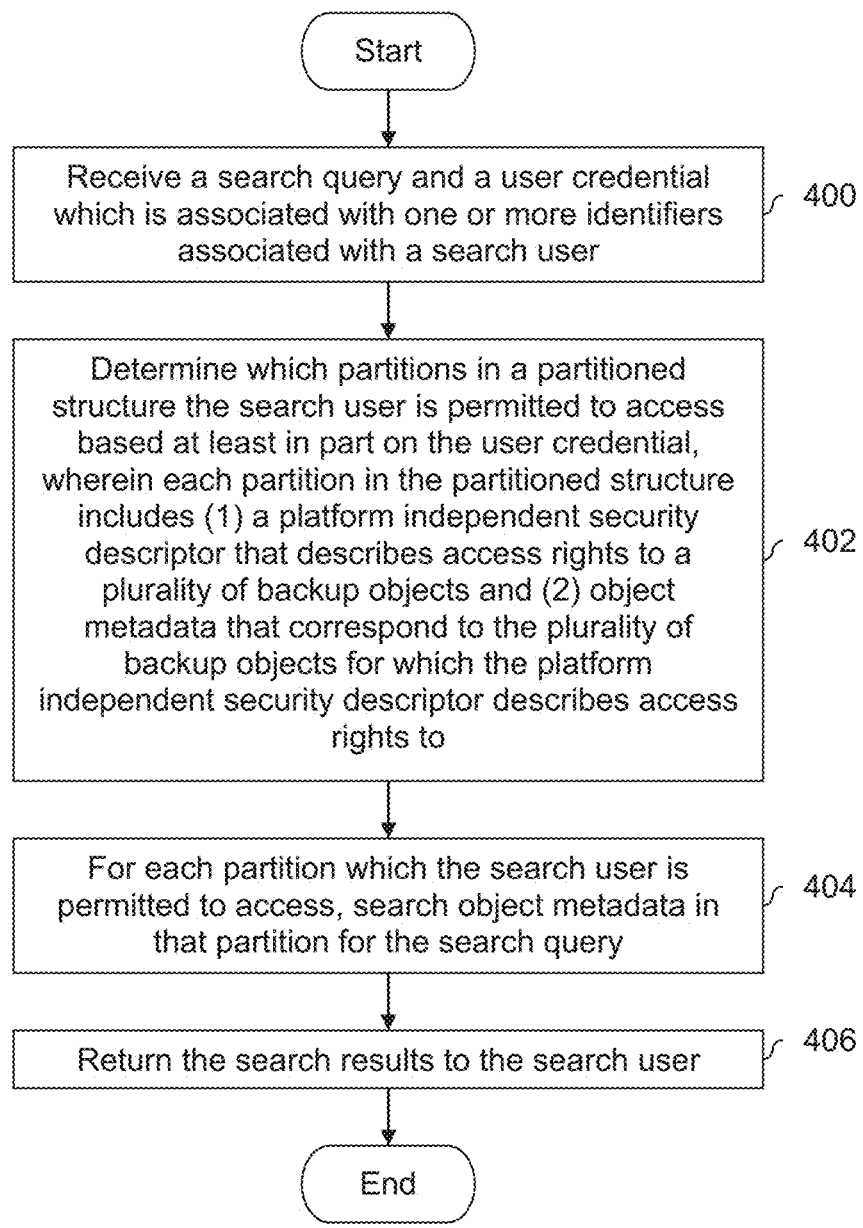
FIG. 4 is a flowchart illustrating an embodiment of a process for performing a secure search using a partitioned structure.

FIG. 4 is a flowchart illustrating an embodiment of a process for performing a secure search using a partitioned structure. In some embodiments, the process is performed by a backup catalog server.

At 400, a search query and a user credential which is associated with one or more identifiers associated with a search user are received. A search query comprises the search parameters or search inputs specified by the search user. In some embodiments, the search query includes the name (or part of a name) of a desired file. In some embodiments, the search query includes the type of backup object or file extension desired (e.g., .doc for a Microsoft Word document, .db for a database, etc.). In some embodiments, a desired timestamp or a range of desired times are included in a search query. In some embodiments, the identifiers associated with the search user are obtained from one or more security servers (e.g., Windows Active Directory, LDAP, NIS, etc.). In some embodiments, the identifiers associated with the search user are obtained from a variety of security domains (e.g., where a security domain may indicate a part of an enterprise network, such as certain servers, which the user is permitted to access).

In some embodiments, a search query includes permission related information. For example, there may be a search option which permits a user to specify that the returned search results must be one for which the search user has write permission (e.g., granted either through the user ID or one of the search user's group IDs). In another example, there may be a search option which permits a user to specify that the returned search results must be one for which the search user is the owner. In another example, there may be a search option which permits a user to specify that the returned search results must be one for which the search user is a member of a group which "owns" an objects.

The following figure shows an example of a user credential.

Figure 5:
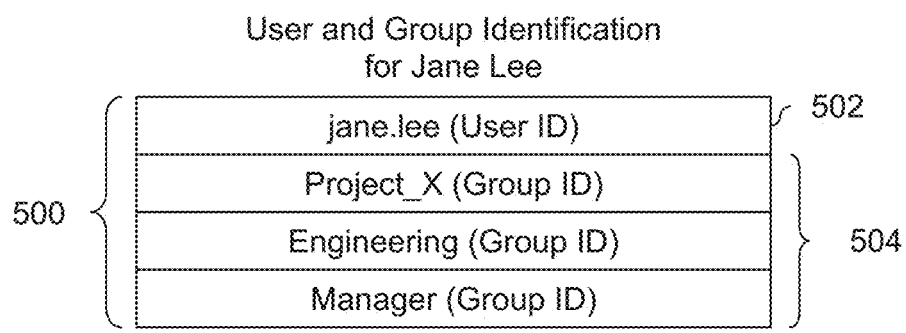
FIG. 5 is a diagram illustrating an embodiment of a user with associated group memberships.

FIG. 5 is a diagram illustrating an embodiment of a user with associated group memberships. In the example shown, 500 includes user identifier 502 (i.e., "jane.lee"). 500 also includes a number of group identifiers. In this example, the user is an engineer, is working on Project X, and is a manager. For each of those roles there is a corresponding group identifier.

Returning to FIG. 4, at 402, it is determined which partitions in a partitioned structure the search user is permitted to access based at least in part on the user credential, wherein each partition in the partitioned structure includes (1) a platform independent security descriptor that describes access rights to a plurality of backup objects and (2) object metadata that correspond to the plurality of backup objects for which the platform independent security descriptor describes access rights to.

In one example of step 402, some sort of filter (such as a Bloom filter) is used to remove at least some partitions from consideration (e.g., without actually accessing the platform independent security descriptors in the partitions themselves). After filtering, for each identifier in a user credential, each platform independent security descriptor which remains is searched for that identifier and an access permission of "r" for read. Using FIG. 5 as an example, first, each remaining platform independent security descriptor (i.e., post-filtering) would be searched for the identifier "janelee" with a permission of read. Then, each remaining platform independent security descriptor would be searched for the identifier "Project_X" with a permission of read. This process continues for the other identifiers "Engineering," and "Manager." As long as one of the identifiers (e.g., "jane.lee," "Project_X," etc.) has read permission in one of the remaining platform independent security descriptor (i.e., post-filtering), the user has access to the corresponding partition within the partitioned structure. In some applications where the amount of memory available to the search system is limited, filtering before actually accessing the platform independent security descriptors is desirable because fewer platform independent security descriptors need to be pulled into memory in order to read the contents.

In another example of step 402, a map is built ahead of time for each user ID and each group ID contained within the platform independent security descriptors in the partitioned structure. Each entry in the map points from a given user ID or group ID to the partitions (or platform independent security descriptors) which that user ID or group ID is permitted to access. For example, if the user ID "jane.lee" is included in a $10^{th}$ partition and a $15^{th}$ partition and the platform independent security descriptors therein are in a state that permits the user ID "jane.lee" access, then the map would have a link or pointer from "jane.lee" to the $10^{th}$ partition and $15^{th}$ partitions. In some embodiments, this predetermined map is consulted to determine what partitions a search user is permitted to access. In some embodiments, the mapping is created when the security descriptor is added to the partitioned structure (e.g., once for each unique security descriptor).

At 404, for each partition which the search user is permitted to access, object metadata in that partition is searched for the search query. For example, suppose a user had access to partition 1 (100) but not partition N (150) in FIG. 1. Object metadata 104 and 106 would be searched for the search query, but object metadata 154 and 156 in partition 150 would not be searched.

At 406, the search results are returned to the search user. For example, if object metadata 104 in FIG. 1 contained the search query but object metadata 106 did not, then information about backup object 108 would be presented to the user, but information about backup object 110 would not be presented. For example, the time at which backup object 108 was last modified, the name of backup object 108, the directory which contained backup object 108, etc. would be displayed to a user.

In some embodiments, returned results are sorted according to some ordering. In one example, the search results for which the search user is listed in some ownership information (e.g., specified using some user ID or group ID) are presented first before search results for which the search user is not listed the ownership information. In another example, search results for which the search user has write permission are returned before search results for which the search user does not have write permission. Sorting results in such a manner may be desirable in applications or environments where hundreds or even thousands of results are returned and/or if the results are returned to a person as opposed to an API.

After the process of FIG. 4 is performed, the user may subsequently perform a variety of operations. In some cases, the user further refines the search because too many search results were returned, or starts a new search because the specified search query did not return the desired results. In some cases, the user selects one or more of the search results and restores the selected backup object(s). For brevity, the restore process itself is not described herein. Generally speaking, since there is a link or association from object metadata to the corresponding backup object (see, e.g., the dotted lines between object metadata and backup objects in FIG. 1), a given backup object can be restored given its object metadata.

Although in some embodiments returning at step 406 comprises a (e.g., graphical) display, in some other embodiments, returning at step 406 comprises returning a data package, for example to some API or other program which takes the search results as an input and performs additional or subsequent processing. For example, the search system described herein may comprise the back-end "guts" for a variety of enterprise companies, but each company has its own API which performs subsequent, company-specific processing on the search results. This may, for example, enable each company to add its own look and feel to the search interface (e.g., how the search results are laid out, adding company logos/graphics, etc.) and/or enforce company-specific policies (e.g., log the search, record the amount of information downloaded and the search user if the service is a pay-for-service arrangement, etc.).

As described above, the partitioned structure described herein enables a faster search compared to some other systems. To illustrate this, consider an enterprise Windows system where it is not uncommon to have approximately half a million to a million files. If metadata associated with each of those half a million to a million files were searched in a straightforward, brute force manner, it would take a significant amount of time to go through all of the metadata corresponding to the half a million or a million files. However, that many Windows files typically correspond to a much smaller number of (unique) security descriptors, for example around 200. Using the search system described herein, fewer things need to be searched (e.g., by first filtering and then accessing the contents of the remaining platform independent security descriptors, or by using a predetermined mapping to determine which partitions the search user has access to). Thus, not only does the search system described herein maintain the same level of object security as originally defined on the primary storage, it is also faster than searching all objects and then applying access rights to the search results. With this added level of security (i.e., since users would not be able to see or restore objects which they do not normally have access to), users can restore backup object on their own, without requiring the assistance or intervention of a system administrator. This means that searches and restores (e.g., over the entire enterprise network) can occur outside of normal business hours and/or in a faster manner since users do not have to wait for a system administrator to assist them.

In some cases, one of the partitions has a platform independent security descriptor with significantly more ACEs and/or has significantly more object metadata that must be searched. As a result, the search through other partitions may have completed and while one or just a few partitions are holding up the search process. In some embodiments, to further speed up the search process, one or more partitions that are larger than others (e.g., as measured by the size of the platform independent security descriptor and/or the amount of object metadata) are sub-divided in order to speed up the search process. In some examples, a sub-division is performed according to modified time or file type.

FIG. 6A is a diagram illustrating some embodiments of platform independent security descriptors. Diagram 600 shows an embodiment of a generic platform independent security descriptor. In the platform independent security descriptors examples shown herein, each entry in a security descriptor is referred to as an access control entry (ACE) and the ACEs collectively comprise an access control list (ACL). For brevity, some components or fields which are not directly related to the secure search technique described herein are not necessarily shown (e.g., there may be an owner ID, a version number, etc. but those fields are not shown since they are not related to the secure search technique described herein).

The action field in each ACE specifies what action the search system performs if the conditions in that ACE are met. "Allow" means that a search through the corresponding partition is permitted if the conditions in that ACE are met (and, if desired, a restoration of the returned search results is also permitted). In some embodiments, there must be no "Deny" action and at least one "Allow" action.

A "Deny" action prevents a search through the corresponding partition if the conditions in that ACE are met. In one example, when a "Deny" is encountered for a user, then the permission check would stop and the result is "Deny.

An "Audit" action causes means that a search is audited or logged if the conditions in that ACE are met. For example, if one "Audit" ACE is satisfied and the user is allowed access (e.g., because there is no "Deny" action and there is at least one "Allow" access), then the search system would permit a search, but would also log information associated with the search (e.g., the user who performed the search, the time at which the search was performed, the device or address from which the search was performed, the specified search terms, the returned search results, which search results were restored (if any)).

An "Alarm" action causes an alarm to be triggered, for example, in the form of an automated email, telephone call, or text message to a system administrator or network security specialist. The interpretation of an "Alarm" action may be configured as desired in various embodiments. In one configuration, an alarm is intended to go off if it is believed that there is an intrusion by malware or hackers. As such, an "Alarm" ACE overrides an "Allow" ACE. In another configuration, alarms are lower-level alerts that a user (who is assumed to be legitimate and/or harmless) is performing a search and may perform a restore. As such, an "Alarm" ACE in this configuration does not stop a search (and, if desired) a restore from occurring if an "Allow" ACE is also satisfied.

The identifier field includes one or more identifiers. For example, the identifier may be a user identifier (i.e., associated with a single user) or a group identifier (e.g., which many users are associated with). The user credential in FIG. 5 gives some examples of identifier(s) which may be included in the identifier field.

The rights field includes the rights that a user having the corresponding identifier has to the backup objects in that partition. For example, the rights may be read, write, and/or execute.

The attributes field is an optional field that includes any number of key value pairs. A key value pair is a paired value (e.g., (x, y)) where the first value is the key and the second value indicates some value for that particular key. In one example, a key of 1 corresponds to "restore location" and so a key value pair of (1, "/usr/jane.lee") would indicate a target or desired restore location of "/usr/jane.lee." In another example, a key of 2 corresponds to a boot location and so a key value pair of (2, "Jane's Computer") would indicate that Jane's Computer is a desired boot location (e.g., for some backed up virtual machine image).

The contents of a platform independent security descriptor may vary depending upon the types of backup object(s) associated with that partition. For example, the search system described herein is anticipated to be used in a variety of enterprise systems which include various platforms (e.g., LINUX and Windows) and backup objects (e.g., files, directories, virtual machine images, storage device LUNs, etc.) and as such one partition may have one type of platform independent security descriptor (e.g., a platform independent security descriptor for a (backed up) project file) and another partition may have another type of platform independent security descriptor (e.g., a platform independent security descriptor for a (backed up) virtual machine image).

The other diagrams in FIG. 6A show some examples of platform independent security descriptors for different types of backup objects.

Diagram 620 shows an example of a platform independent security descriptor for backed up project file(s). In this example, the security descriptor is associated with a partition that includes one or more project files that have been backed up. Per the first and second ACE in diagram 620, any user associated with the user ID "janelee" or the group ID "Project_X" is permitted to search backup objects associated with the associated partition.

Per the third ACE in diagram 620, any user associated with the group ID "Contractor" is audited. For example, a contractor with the group IDs "Project_X" and "Contractor" would be permitted to search backup objects within this partition, but the search (and subsequent restorations, if any) would be logged in an audit log.

Per the fourth ACE in diagram 620, any user that wants to perform a restore outside of the company's network would be blocked from doing so (in this particular example, an Alarm ACE overrides an Allow ACE). In some embodiments, the restore location is obtained from the user after a search has been performed and only if the user indicates they want to restore one or more of the search results. For example, a desired restore location is not obtained from user during the search process and so the attribute field is not consulted during the search process. Only after search results have been returned to the user and the user selects one or more search results to restore does the system ask for a desired restore location. With the restore location specified, the system may go back to the security descriptor to ensure that a restore at the specified restore location is permitted. To put it another way, the attributes field (in this example at least) is not used during the search process but is rather consulted later during the (optional) restore step.

Diagram 640 shows an example of a platform independent security descriptor for backed up virtual machine image(s). For brevity, only a single ACE is shown in diagram 640; other ACEs may be specified as described above (e.g., to audit certain users, to block certain users, etc.). In this particular example, the user ID "jane.lee" is permitted to perform a search of the associated partition. Boots of any virtual machine images selected from search results are permitted if the boot location is "Jane's Computer." For example, it may be undesirable to let Jane boot a virtual machine image on any device other than her own computer.

In some embodiments, a search interface is configured to automatically collect the location from which a search is being performed and include that location in a search query. If the included location does not match the boot location in the access control entry (e.g., "Jane's Computer") then the ACE is not satisfied or otherwise met. In such embodiments, the search/restore interface may be configured to only permit a boot to occur locally on the device from which a search is initiated (e.g., the user cannot target a remote device on which a virtual machine image is booted).

Diagram 660 shows a platform independent security descriptor for backed up configuration(s) (e.g., sometimes referred to as settings). In this example, configurations of applications are backed up. The user ID "jane.lee" is permitted to search the associated partition and (if desired) restore the configuration if the device on which the configuration is to be restored is "Jane's Computer." As before, only a single ACE is shown in diagram 660 for brevity.

In some embodiments, a boot location or a restore location in the attributes field of a platform independent security descriptor is automatically populated (e.g., during a backup process) with the location or device from which the backup data is received. For example, in diagram 640, the virtual machine image is backed up from "Jane's Computer." Similarly, in diagram 660, the configurations of the application in question are backed up from "Jane's Computer."

Using platform independent security descriptors (some examples of which are shown in FIG. 6A) may be attractive because it does not depend upon native application authentication. For example, an alternate solution may be to consult a native application interface (e.g., Microsoft's AccessCheck) in order to determine what access rights a user (e.g., having a certain user ID or having a certain group ID) has with respect to certain objects. This may consume network bandwidth and create additional load at the native application which is undesirable. It would also require platform dependence and tie performance to native application performance. Using security descriptors as shown herein decouples the validation process from a specific platform.

Native application authentication solutions may also be incomplete or inadequate with respect to some of the permission scenarios which may be encountered by a search system. Consider, for example, the virtual machine image associated with diagram 640. Although a user may be permitted to interact with an already-running or already-mounted virtual machine image, it is another thing to permit that same user to boot the same virtual machine image. Native application authentication solutions may be geared more towards the question of whether a given user is permitted to interact with an already mounted virtual machine image and not so much the question of whether it is appropriate to let a certain user boot up (that is, restore) a (backed up) virtual machine image. Platform independent security descriptors may be supplemented with additional information and/or may be better directed towards answering the question of whether a given user can or should restore (e.g., by booting) a virtual machine image or other backup object. For example, this is a question where it may be helpful to know the boot location before deciding if it is appropriate to let a user boot a virtual machine image. Presumably if the boot location is (on) the search user's own device then the search user will know if that device is in a state where it is ready to have a virtual machine image booted on it.

In some embodiments, a partitioned structure may optionally include information in addition to that shown in FIG. 1. The following figure shows an example of such information.

Figure 6B:
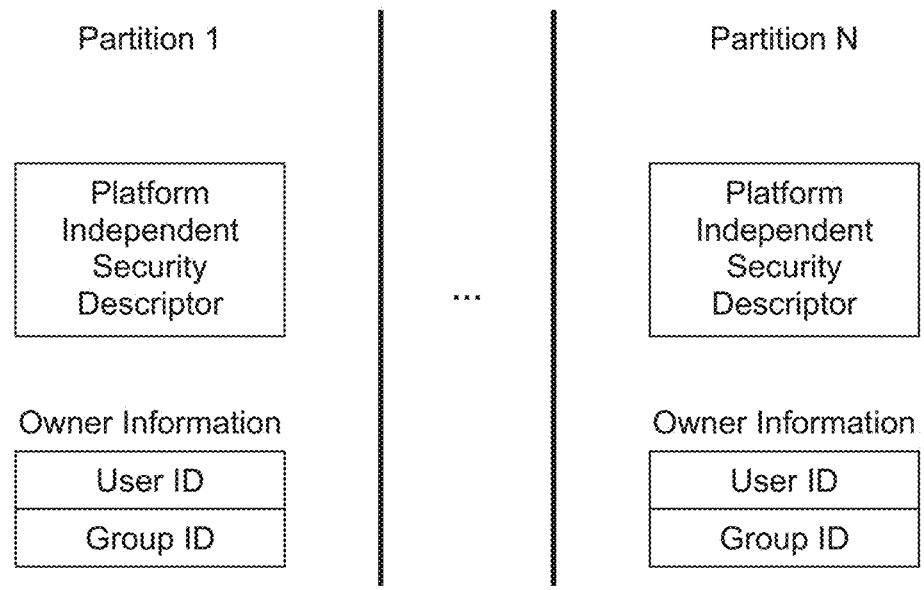
FIG. 6B is a diagram illustrating an embodiment of partitions which include ownership information.

FIG. 6B is a diagram illustrating an embodiment of partitions which include ownership information. For brevity, the object metadata and backup objects which are shown in FIG. 1 are not shown herein. In this example, each of the N partitions includes ownership information, including a user ID and a group ID. For example, the user ID for each partition may be obtained from a first permission triad (associated with that particular partition) which identifies an owner. Similarly, the group ID for each partition may be obtained from a second permission triad associated with that particular partition. Naturally, in some embodiments, the information shown may be grouped or organized in some other manner. For example, ownership information (i.e., the user ID and group ID) may be part of the platform independent security descriptor themselves.

In some embodiments, the ownership information is used if the user has (optionally) specified that the search results have certain ownership information (e.g., via the search query), such as a certain user ID or a certain group ID. For example, the search user may only want to see search results where her user ID is the owner and/or where a group ID associated with her is the group for that object.

In some embodiments, the ownership information is used to sort the order in which search results are returned. For example, search results for which the search user's user ID is the owner may be returned first. For example, if the search user is "jane.lee" but the user ID in the owner information is "michael.smith," then that search result would come after a search result for which the user ID in the owner information is "jane.lee." In some embodiments, search results for which the search user's user ID is identified in a first permission triad come first, followed by search results for which one of the search user's group IDs is identified in a second permission triad (but for which the search user's user ID is not identified in a first permission triad), which is following by search results for which the search user's user ID is not identified in a first permission triad and for which none of the search user's group IDs is identified in a second permission triad.

Figure 7:
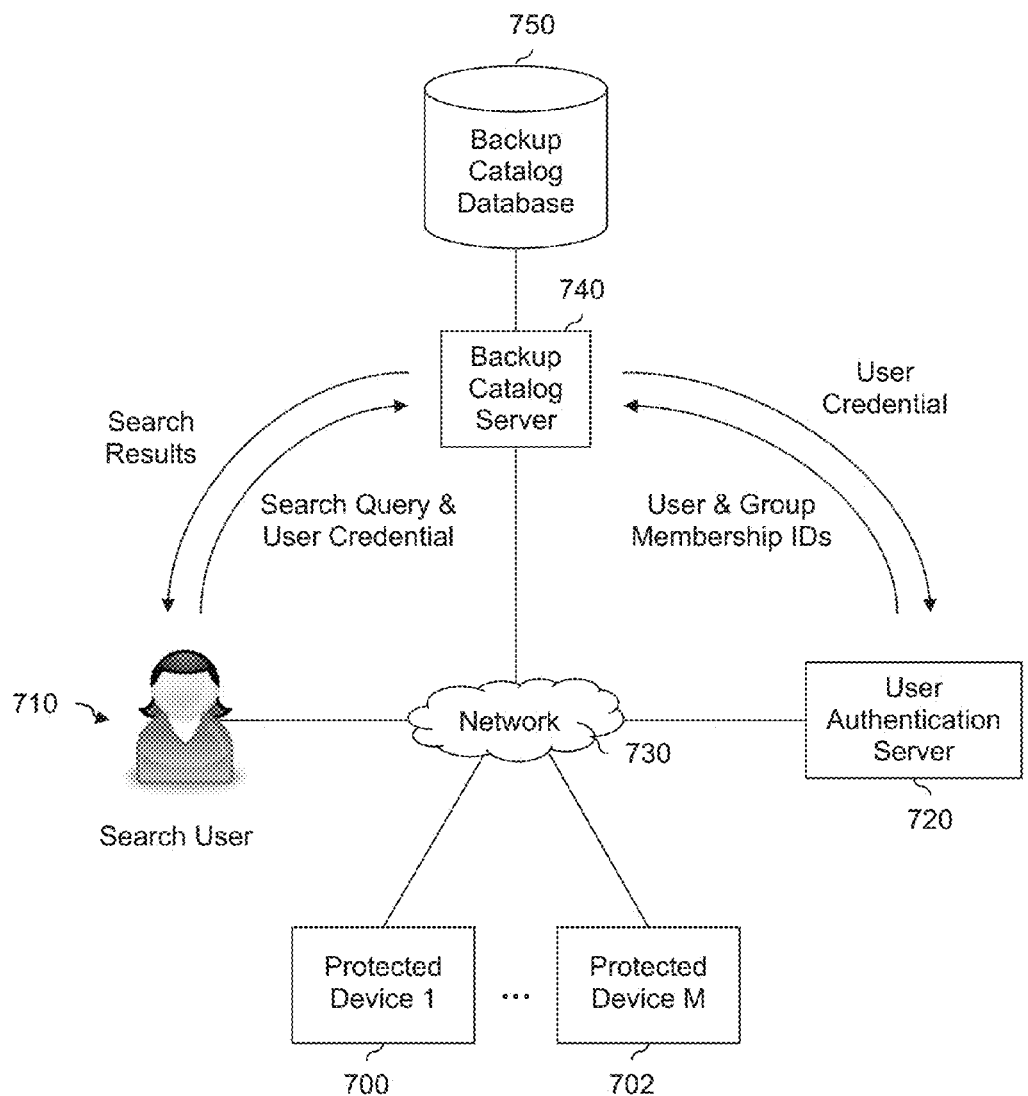
FIG. 7 is a diagram illustrating an embodiment of a secure search system.

FIG. 7 is a diagram illustrating an embodiment of a secure search system. In the example shown, there are M protected devices (e.g., 700 and 702) which are backed up using backup catalog server 740 and backup catalog database. A search user (710) sends her search query and user credentials to backup catalog server (740) via network 730. Backup catalog server (740) sends the received user credentials to the authentication server 720 and receives user and group membership identifiers for search user 710 in response. For example, FIG. 5 gives one example of a user's group associations which is retrieved from the authentication server 720 and returned to backup catalog server 740.

Backup catalog server 740 performs the search (e.g., by first determining what partitions the user is permitted to access using the user and group identifiers). Backup catalog server 740 may then search metadata objects in the permitted partitions for the term(s) in the search query. Search results are returned to search user 710. In some embodiments, the search results are sorted, for example using ownership information. If desired, subsequent actions such as starting a new search, further refining a specified search, or restoring a selected backup object returned by the search may be initiated by search user 710.

In some embodiments, determining which partitions in a partitioned structure the search user is permitted to access includes first eliminating at least some partitions using a filter (e.g., without actually comparing a user credential against a platform independent security descriptor) and then comparing the user credential against the remaining platform independent security descriptors. The following figures show some examples of this.

Figure 8:
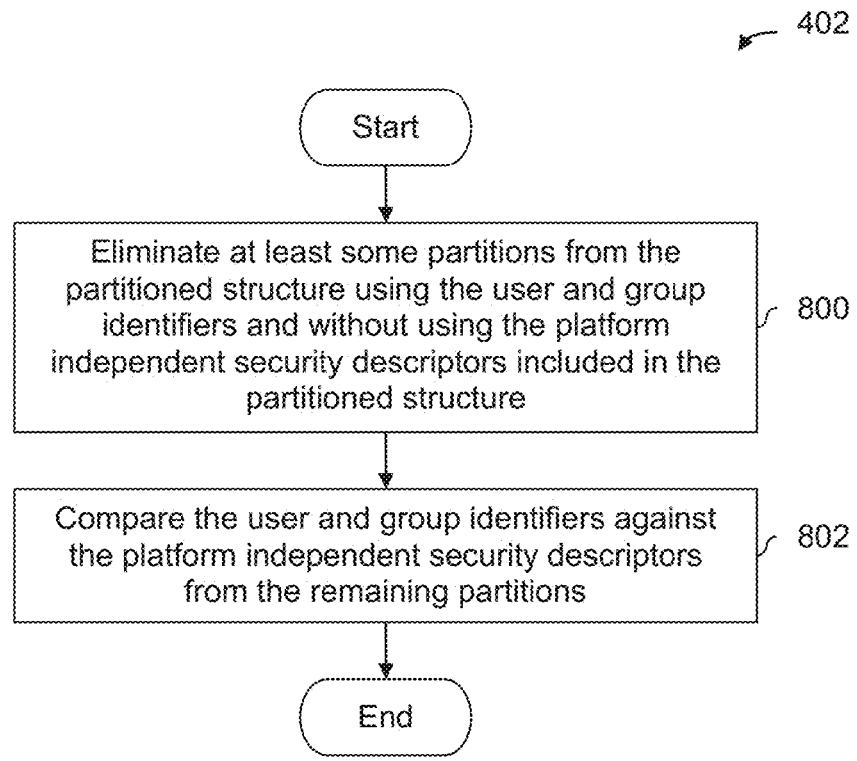
FIG. 8 is a flowchart illustrating an embodiment of a process for determining which partitions in a partitioned structure the search user is permitted to access.

FIG. 8 is a flowchart illustrating an embodiment of a process for determining which partitions in a partitioned structure the search user is permitted to access. In some embodiments, step 402 in FIG. 4 is performed as shown.

At 800, at least some partitions are eliminated from the partitioned structure using the user and group identifiers and without using the platform independent security descriptors included in the partitioned structure. For example, a Bloom filter may be used. A more detailed description of a Bloom filter is described below.

At 802, the user and group identifiers are compared against the platform independent security descriptors from the remaining partitions.

Conceptually, what step 800 does is it eliminates at least some partitions from consideration in a manner that is faster than if the platform independent security descriptor from the eliminated portioned had been compared against the user credential. Step 800 does not eliminate all of the partitions that will eventually be discounted given the user credential for that search user and platform independent security descriptors in the partitioned structure. However, those partitions that are eliminated at step 800 are properly eliminated.

Still speaking conceptually, step 802 definitively or finally determines what partitions the search user is permitted to access (e.g., no more, no less) by actually comparing each user ID, group ID, etc. against each ACE in each platform independent security descriptor from the remaining partitions.

Together, the total processing time of steps 800 and 802 is faster than if the user credential were compared against each platform independent security descriptor without first eliminating at least some partitions or platform independent security descriptors.

Figure 9:
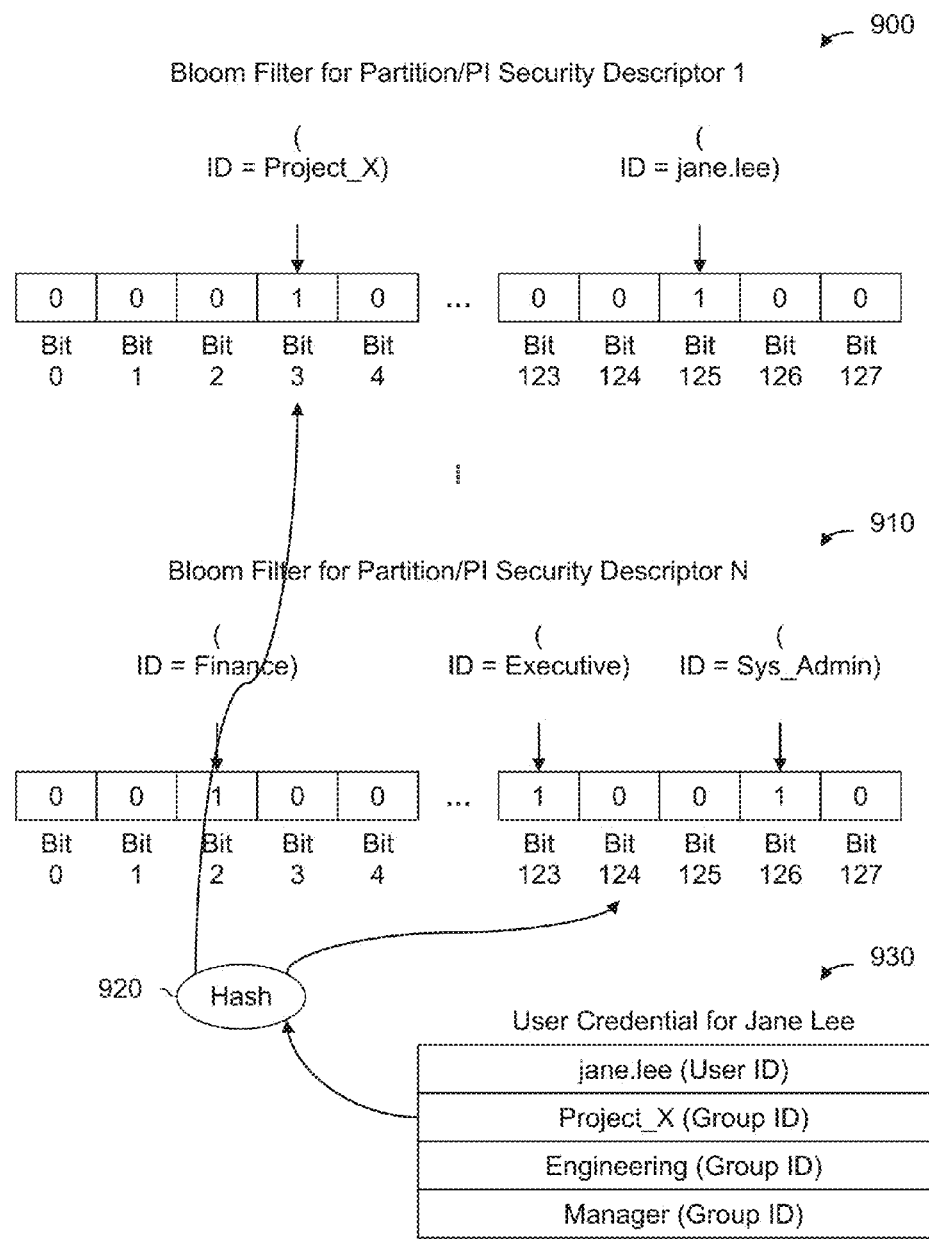
FIG. 9 is a diagram illustrating an embodiment of a Bloom filter.

FIG. 9 is a diagram illustrating an embodiment of a Bloom filter. In some embodiments, a Bloom filter is used at step 800 in FIG. 8 to reduce the memory footprint of the system but not needing to have all platform independent security descriptors resident in memory.

In the example shown, there is a Bloom filter for each of the N partitions or N platform independent security descriptors. For example, Bloom filter 900 corresponds to the first partition or platform independent security descriptor and Bloom filter 910 corresponds to the $N^{th}$ partition or platform independent security descriptor. Each 1 value in a Bloom filter corresponds to a user or group ID in an Access Control Entry (ACE). In some embodiments, the exact rights from the ACE are not necessarily considered since the ACE still needs to be interpreted, instead the Universally Unique Identifier (UUID) from the ACE is used. For example, in Bloom filter 900, bit 3 (which is a 1) corresponds to (ID=Project_X) and bit 125 (which is a 1) corresponds to (ID=jane.lee); indicates that access may be possible. Bloom filters give false positives but never false negatives because there may be collisions of values in the bit map of the Bloom filter. The Bloom filter indicates access may be possible and therefore the Security descriptor needs to be checked. In the Bloom filter 910, bit 2 (which corresponds to (ID=Finance)), bit 123 (which corresponds to (ID=Executive)), and bit 126 (which corresponds to (ID=Sys_Admin)) are all 1 and access may be granted to the corresponding partition for those combinations of action, right, and ID. Each Bloom filter is populated with 0s and 1s ahead of time and may be updated if/as the corresponding platform independent security descriptor changes. In the case of a deletion, a Bloom filter must be regenerated as Bloom filters do not support deletes.

Hash 920 takes in 3 inputs in this example: a desired action (e.g., "Allow"), a desired right (e.g., "Read"), and a user ID, group ID, or security domain from user credential 930. In this example, user credential 930 has 5 identifiers, and hash 920 will go through each of the 5 elements in user credential 930.

The results of hash 920 will point to one or more bit positions within the N Bloom filters. If the bit pointed to is a 1, then the partition that corresponds to that Bloom filter is kept (at least for now; e.g., it may be later eliminated at step 802 in FIG. 8). For example, the results of hash 920 point to bit 3 in Bloom filter 900, which has a value of 1. Since the bit pointed to is a 1, the first partition is not discarded (e.g., at least for now). In Bloom filter 910, hash 920 points to bit 124, which is a 0. As such, the $N^{th}$ partition would be eliminated from consideration.

In some cases, the results of hash 920 will point to a 1 in a Bloom filter even though the corresponding partition will later be eliminated when the user's credentials are compared against the ACEs in the platform independent security descriptor for that partition. In other words, false positives can occur with a Bloom filter. However, if a partition is eliminated using a Bloom filter, that partition would have been eliminated anyway when the user's credentials are compared against the ACEs in the platform independent security descriptor for that partition. In other words, false negatives cannot occur with a Bloom filter.

In some embodiments, determining which partitions in a partitioned structure the search user is permitted to access includes using a predetermined mapping. The following figure shows an example of this.

Figure 10:
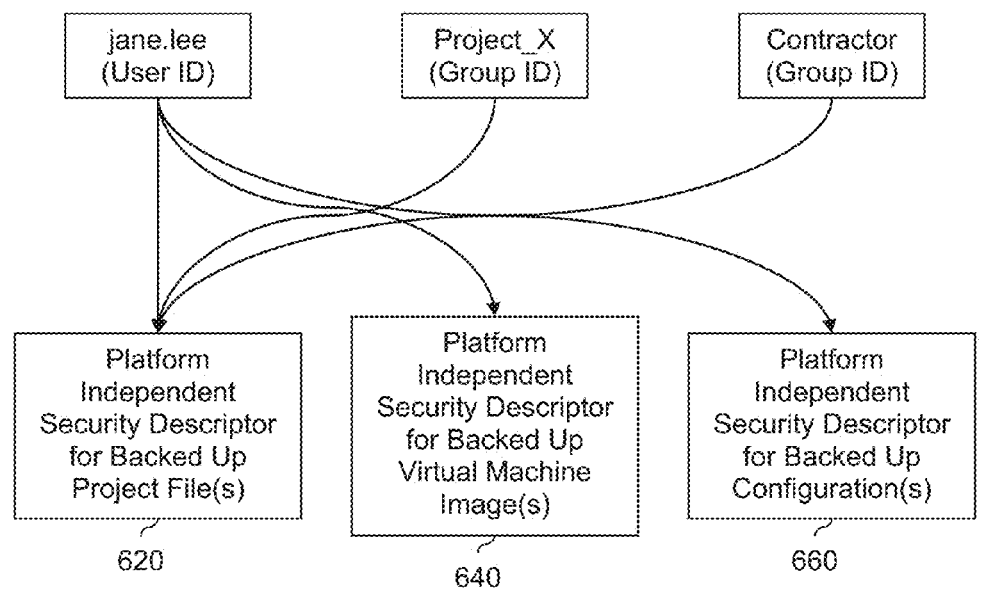
FIG. 10 is a diagram illustrating an embodiment of a predetermined mapping.

FIG. 10 is a diagram illustrating an embodiment of a predetermined mapping. In some embodiments, such a mapping is used at step 402 in FIG. 4 to determine what partitions or platform independent security descriptors the search user is permitted to access. FIG. 10 builds upon the example of platform independent security descriptors 620, 640 and 660 in FIG. 6 and for convenience those reference numbers are repeated herein.

In the mapping, each user ID or group ID included in the partitioned structure has a link or reference to those partitions or platform independent security descriptors that that user ID or group ID is permitted to access. In the example of FIG. 6, this corresponding to an "Allow Read" ACE. The user ID "jane.lee" is included in an "Allow Read" ACE in platform independent security descriptors 620, 640, and 660 and thus has links to all three. The group ID "Project_X" is only permitted to access platform independent security descriptor 640 and thus includes a link to that platform independent security descriptor but not platform independent security descriptors 640 and 660. Similarly, the group ID "Contractor" is (only) included in an "Allow" ACE in platform independent security descriptor 640 and thus points (only) to that platform independent security descriptor.

Naturally, as the contents of platform independent security descriptors change, the mapping is updated to reflect any changed access permission.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
receive, from a plurality of platforms, a plurality of backup objects, a plurality of native security descriptors that describe access rights to the plurality of backup objects, and a plurality of object metadata, wherein each backup object has a corresponding object metadata;
transform each native security descriptor into a platform independent security descriptor; and
generate a partitioned structure which includes a plurality of partitions, including by associating each platform independent security descriptor with those object metadata that correspond to the plurality of backup objects for which that platform independent security descriptor describes access rights to, wherein:

each partition in the partitioned structure includes: (1) a platform independent security descriptor that describes access rights to a plurality of backup objects, (2) object metadata that correspond to the plurality of backup objects for which the platform independent security descriptor describes access rights to, and (3) ownership information; and the partitioned structure is used to determine which partitions in the partitioned structure a search user is permitted to access, including by:

sending a user credential from a backup catalog server to a user authentication server;

receiving, in response to sending the user credential, an identifier for the search user from the backup catalog server;

comparing the identifier for the search user against the ownership information in order to eliminate, without considering the platform independent security descriptors, any partitions in the partitioned structure which do not have ownership information which includes the identifier for the search user; and comparing the user credential against those platform independent security descriptors from those partitions which remain after the elimination;

the partitioned structure is stored on a backup catalog server; and the plurality of backup objects are stored on a backup catalog database.

2. The system of claim 1, wherein:

at least one native security descriptor includes: a first permission triad that indicates the permissions of an owner, a second permission triad that indicates the permissions of a group, and a third permission triad that indicates the permissions of others; and transforming includes creating a first access control entry associated with the first permission triad and a second access control entry associated with the second permission triad.

3. The system of claim 1, wherein the memory is further configured to provide the processor with instructions which when executed cause the processor to generate, for each partition in the partitioned structure, the ownership information, including by:

including, in the ownership information for a given partition, a user identifier associated with a first permission triad associated with that partition; and including, in the ownership information for the given partition, a group identifier associated with a second permission triad associated with that partition.

4. The system of claim 1, wherein transforming includes taking into consideration permissions on one or more parent directories.

5. A system, comprising:

a processor; and a memory coupled with the processor, wherein the memory is configured to provide the processor with instructions which when executed cause the processor to:

receive, at a backup catalog server, a search query and a user credential which is associated with one or more identifiers;

determine which partitions in a partitioned structure a search user is permitted to access based at least in part on the user credential, wherein:

each partition in the partitioned structure includes: (1) a platform independent security descriptor that describes access rights to a plurality of backup objects, (2) object metadata that correspond to the plurality of backup objects for which the platform independent security descriptor describes access rights to, and (3) ownership information; and determining which partitions in the partitioned structure the search user is permitted to access includes:

sending the user credential from the backup catalog server to a user authentication server;

receiving, in response to sending the user credential, an identifier for the search user from the backup catalog server;

comparing the identifier for the search user against the ownership information in order to eliminate, without considering the platform independent security descriptors, any partitions in the partitioned structure which do not have ownership information which includes the identifier for the search user; and comparing the user credential against those platform independent security descriptors from those partitions which remain after the elimination;

for each partition which the search user is permitted to access, search object metadata in that partition for the search query; and return the search results to the search user, wherein:

the partitioned structure is stored on a backup catalog server; and the plurality of backup objects are stored on a backup catalog database.

6. The system of claim 5, wherein eliminating includes using a Bloom filter.

7. The system of claim 5, wherein determining which partitions in the partitioned structure the search user is permitted to access includes using a predetermined mapping.

8. The system of claim 5, wherein the search query includes specified ownership information and the returned search results satisfy the specified ownership information.

9. The system of claim 5, wherein returning the search results to the search user includes sorting the search results such that those search results which include write permission are listed before those search results without write permission.

10. The system of claim 5, wherein the object metadata includes one or more references to one or more backup objects that can be used to restore those backup objects.

11. The system of claim 5, wherein returning the search results to the search user includes sorting the search results based at least in part on the ownership information such that (1) those search results for which the search user is associated with an owner in the ownership information are listed before (2) those search results for which the search user is not associated with the owner in the ownership information and the search user is associated with a group in the ownership information.

12. A method, comprising:

receiving, from a plurality of platforms, a plurality of backup objects, a plurality of native security descriptors that describe access rights to the plurality of backup objects, and a plurality of object metadata, wherein each backup object has a corresponding object metadata;

transforming each native security descriptor into a platform independent security descriptor; and using a processor to generate a partitioned structure which includes a plurality of partitions, including by associating each platform independent security descriptor with those object metadata that correspond to the plurality of backup objects for which that platform independent security descriptor describes access rights to, wherein:

each partition in the partitioned structure includes: (1) a platform independent security descriptor that describes access rights to a plurality of backup objects, (2) object metadata that correspond to the plurality of backup objects for which the platform independent security descriptor describes access rights to, and (3) ownership information; and the partitioned structure is used to determine which partitions in the partitioned structure a search user is permitted to access, including by:

sending a user credential from a backup catalog server to a user authentication server;

receiving, in response to sending the user credential, an identifier for the search user from the backup catalog server;

comparing the identifier for the search user against the ownership information in order to eliminate, without considering the platform independent security descriptors, any partitions in the partitioned structure which do not have ownership information which includes the identifier for the search user; and comparing the user credential against those platform independent security descriptors from those partitions which remain after the elimination;

the partitioned structure is stored on a backup catalog server; and the plurality of backup objects are stored on a backup catalog database.

13. The method of claim 12, wherein:

at least one native security descriptor includes: a first permission triad that indicates the permissions of an owner, a second permission triad that indicates the permissions of a group, and a third permission triad that indicates the permissions of others; and transforming includes creating a first access control entry associated with the first permission triad and a second access control entry associated with the second permission triad.

14. The method of claim 12 further comprising generating, for each partition in the partitioned structure, the ownership information, including by:

including, in the ownership information for a given partition, a user identifier associated with a first permission triad associated with that partition; and including, in the ownership information for the given partition, a group identifier associated with a second permission triad associated with that partition.

15. The method of claim 12, wherein transform includes taking into consideration permissions on one or more parent directories.

16. A method, comprising:

receiving, at a backup catalog server, a search query and a user credential which is associated with one or more identifiers;

using a processor to determine which partitions in a partitioned structure a search user is permitted to access based at least in part on the user credential, wherein:

each partition in the partitioned structure includes: (1) a platform independent security descriptor that describes access rights to a plurality of backup objects, (2) object metadata that correspond to the plurality of backup objects for which the platform independent security descriptor describes access rights to, and (3) ownership information; and determining which partitions in the partitioned structure the search user is permitted to access includes:

sending the user credential from the backup catalog server to a user authentication server;

receiving, in response to sending the user credential, an identifier for the search user from the backup catalog server;

comparing the identifier for the search user against the ownership information in order to eliminate, without considering the platform independent security descriptors, any partitions in the partitioned structure which do not have ownership information which includes the identifier for the search user; and comparing the user credential against those platform independent security descriptors from those partitions which remain after the elimination;

for each partition which the search user is permitted to access, searching object metadata in that partition for the search query; and returning the search results to the search user, wherein:

the partitioned structure is stored on a backup catalog server; and the plurality of backup objects are stored on a backup catalog database.

17. The method of claim 16, wherein eliminating includes using a Bloom filter.

18. The method of claim 16, wherein using a processor to determine which partitions in the partitioned structure the search user is permitted to access includes using a predetermined mapping.

19. The method of claim 16, wherein the search query includes specified ownership information and the returned search results satisfy the specified ownership information.

20. The method of claim 16, wherein returning the search results to the search user includes sorting the search results such that those search results which include write permission are listed before those search results without write permission.

21. The method of claim 16, wherein the object metadata includes one or more references to one or more backup objects that can be used to restore those backup objects.

22. The method of claim 16, wherein returning the search results to the search user includes sorting the search results based at least in part on the ownership information such that (1) those search results for which the search user is associated with an owner in the ownership information are listed before (2) those search results for which the search user is not associated with the owner in the ownership information and the search user is associated with a group in the ownership information.

\* \* \* \* \*